Sept. 7, 1965  E. STARMUEHLER  3,204,615
ROTARY PISTON MACHINE
Filed Nov. 8, 1961
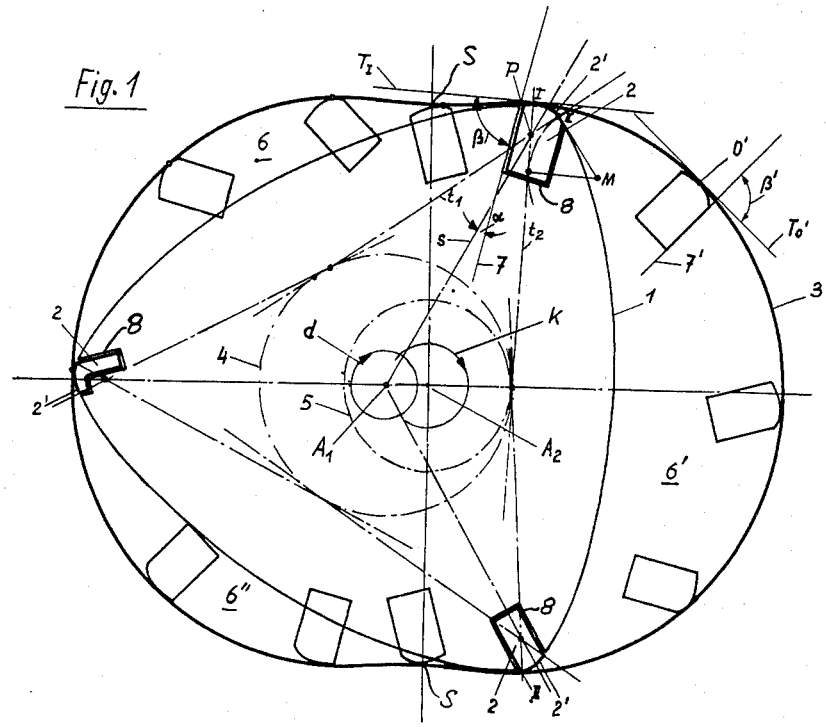
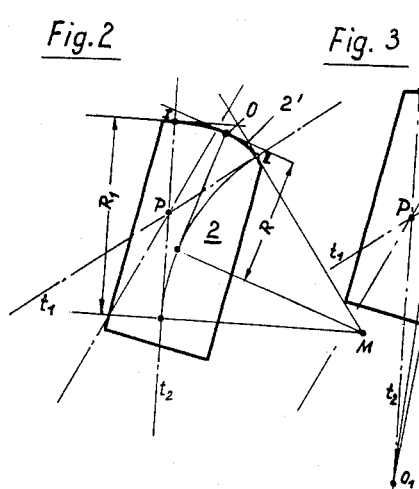
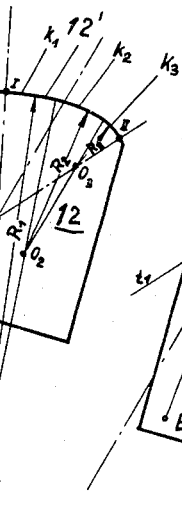
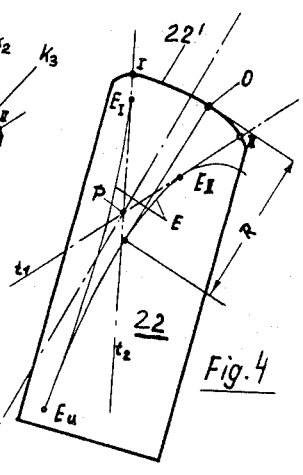
INVENTOR
ERWIN STARMUEHLER
BY Dicke and Craig
ATTORNEYS

United States Patent Office 3,204,615
Patented Sept. 7, 1965

3,204,615
ROTARY PISTON MACHINE
Erwin Starmuehler, Munich, Germany, assignor to Bayerische Motoren Werke Aktiengesellschaft, Munich, Germany
Filed Nov. 8, 1961, Ser. No. 150,960
Claims priority, application Germany, Nov. 9, 1960, B 60,027
8 Claims. (Cl. 123—8)

The present invention relates to a rotary piston machine comprising a piston which rotates relative to a stationary or rotating housing having an inner contour in the form of an envelope, and wherein the piston describes said envelope and the outer contour parts of the piston participating in forming said envelope are supported by sealing elements inserted therein.

Rotary piston machines in which the inner contour of the housing has the shape of an epitrochoid or an outer parallel curve thereof are known in the prior art. In such arrangements the piston is provided as inside envelope of the inner contour of the housing. A plurality of operating chambers are defined between the housing and the piston whose volumes vary in dependence upon the relative position of the piston within the housing. It is known to insert sealing elements in the corners or apices of the piston having either sharp edges which are continuously in line contact with the epitrochoid, or circular edges sliding on a curve parallel to the epitrochoid and which are also in line contact therewith. Such sealing elements abut against the housing in each position of the piston with regard to a mean curvature of the inside contour of the housing with the same angle or degree of engagement. During operation, however, there will be considerably different conditions along the inside contour of the housing which will result in different wear loads and stresses on certain parts of the inner surface of the housing and of the sealing surface contour of the sealing elements. Accordingly, peak local wear and stresses will occur in certain areas of the inner surface of the housing as well as on the sealing elements. Such localized wear and strain peaks are present at those positions of the piston with respect to the inner contour of the housing where there occurs a change in direction of the pressure gradient between two working chambers separated by a sealing element. Since at these points or in these regions, a rapid inversion of the pressure force acting on the sealing element intermediate these two chambers takes place due to the variable gas pressure within the chambers disposed on opposite sides of a piston apex containing the intermediate sealing element, the intermediate sealing element is thereby rapidly laterally displaced in its guide groove in the direction of the pressure gradient. In other words, the sealing element is displaced towards the side of the guide groove adjacent the working chamber having the lower pressure.

In the known rotary piston machines, the sides of the sealing elements within the region of the points of the inner contour of the housing having the lowest and the greatest distance from the housing center, are disposed at an angle of about 90° with regard to the tangents resting against the inner contour of the housing in these points. Within the intermediate regions or areas of the inner contour of the housing, however, the same are arranged at an angle quite different from 90°. If the change of direction of the pressure gradient takes place in these areas or regions, which is true for the known rotary piston machines, then the direction of the horizontal movement of the sealing elements within their grooves will be different from the direction of the inner contour of the housing. Accordingly, the sealing element must thus, in addition to its lateral movements, be also shifted radially within the guide groove in order to maintain contact with the inner wall of the housing. At those points where the sealing element has to move radially outwardly in the guide groove and where such movement is not carried out sufficiently rapidly, the sealing element is disengaged from contact with the inner wall of the housing. Aside from the loss due to leakage of gas, there will be a strong impact when the sealing element again touches the inner housing wall which impact will, in turn, cause oscillating movements of the sealing element. Consequently, an increased wear in the form of chatter marks will be caused on that point of the inner housing during the operation period of the rotary piston machine. This will be particularly the case in internal combustion engines since the points on which the horizontal movements of the sealing elements occur are, in such internal combustion engines, simultaneously the fired or combustion zones with the highest temperatures.

In contradistinction, the present invention proposes to overcome localized peak wear by providing that portion of the contour of the sealing elements which produces the inner envelope with a curvature having a constantly or gradually changing radius from one end to the other, and which is so correlated to bear a predetermined relationship with regard to the envelope that the section of the sealing surface contour with the largest radius values makes contact with the envelope in the region or regions where the inner wall of the housing is exposed to the greatest wear and stresses. In such regions, the present invention thus provides a better fitting engagement of the sealing elements with respect to the inner housing contour and thus mitigates the problems of localized peak wear and stresses.

In rotary piston machines, particularly in rotary piston internal combustion engines wherein the chamber with the highest compression of the charge corresponds essentially to the combustion chamber and extends on both sides of a point on the inner housing contour having the shortest distance from the center of the housing, the present invention proposes that the arrangement and contour of the sealing elements be so chosen that the segment or section thereof having the highest radius values is in effective contact with the inner housing contour within an area behind and adjacent to the point with the shortest distance from the center of the housing as determined in the sense of rotation of the piston seen relative to the housing.

The curvature of the sealing surface contour of the sealing elements may be predetermined so that the contour will vary from a minimum to a maximum value whereby, for example, in a housing having a two-arch inner contour, a high degree of sealing engagement of the sealing elements with the inner contour of the housing is attained at two places. When the curvature varies from a minimum to a maximum and back to a minimum value, there will be four places having a high degree of sealing engagement with the above-mentioned example. With a contour varying from a maximum to a minimum and back to a maximum value, there will again be four equally favorable points of engagement. The most advantageous selection of a contour from these possibilities may be made in accordance with the structure of the rotary piston machine, i.e., in dependence on whether the machine has an equidirectional or oppositely arranged sense of rotation, or whether the machine is intended to function as an internal combustion engine or as a compressor, etc.

The curvature of the sealing elements' contour may have any desired shape which will carry out the aforementioned purposes. However, for the purposes of manufacture, it is advantageous to use the involute of a curve, and preferably of a circle. It is also possible to utilize two or more joint involutes, or several joint circular arcs with different radii and common tangents at each point of juncture.

In order to provide light sealing elements even when the latter have wide sealing surface contours, it is particularly desirable to construct the sealing elements of an essentially L-shaped cross section which is known per se, whereby one of the legs of the L supports the contoured sealing surface, and the other leg is engaged within a guide groove in the piston.

The present invention also effectively eliminates the drawbacks of known devices resulting from radial movement of the sealing elements by inclining the lateral sides of the sealing elements and the guide grooves within the piston with respect to the symmetrical axes through the apices of the piston in such a manner that the lateral sides include an angle of approximately 90° with the tangents on the inner contour of the housing throughout the region at the respective points of contact between a point on the inner housing contour having the smallest distance from the center of the housing and a point having the greatest distance from the center of the housing. As a result of this arrangement, the lateral movements of the sealing elements in their guide grooves take place in the direction of the inner housing contour and are essentially parallel thereto so that disengagement or removal of the sealing elements from the inner housing contour is effectively prevented. In this manner, the wear phenomena resulting from the re-engagement of the sealing elements with the housing after a previous disengagement are decreased or eliminated.

Accordingly, one of the primary objects of the present invention is to provide a rotary piston machine better able to withstand the localized peak stresses and strains prevalent in such machines.

Another object of the present invention is to provide a rotary piston machine having sealing elements contoured to provide maximum sealing engagement with the inner housing contour in regions of greatest wear and stress.

Still another object of the present invention is to provide sealing elements for a rotary piston having a sealing surface contour whose curvature changes from one end to the other.

Still another object of the present invention is to provide an improved sealing element for a rotary piston machine.

A further object of the present invention is to reduce essentially radial displacement of rotary piston machine sealing elements within respective guide grooves in a rotary piston to effectively prevent disengagement of the sealing elements from the inner contour of the housing.

These and other objects, features and advantages of the present invention will become more apparent when taken in conjunction with the accompanying description and drawings wherein:

FIGURE 1 illustrates schematically a rotary piston machine including a piston having equidirectional circular and rotational movements and with sealing elements inserted therein in accordance with the present invention, and is illustrative of the changing points of contact between a representative sealing element and the housing during during rotation of the piston;

FIGURE 2 illustrates on a magnified scale one embodiment of a sealing element in accordance with the present invention having a sealing surface contour in the form of an involute of a circular arc;

FIGURE 3 illustrates on a magnified scale another embodiment of the sealing element in accordance with the present invention having a form of several circular arcs of different radii arranged in succession; and FIGURE 4 illustrates a further embodiment of a sealing element in accordance with the present invention also on a magnified scale.

Referring now to the drawings and more particularly to FIGURE 1, reference numeral 1 designates a rotary piston having an approximately triangular shape and provided at its corners or apices with sealing elements 2 inserted therein. For the sake of clarity, sealing elements 2 are illustrated on a magnified scale with respect to the remainder of the apparatus. Piston 1 is rotatably positioned within a housing 3 in such a manner that the center axis $A_1$ of piston 1 traverses a path $k$ around the center axis $A_2$ of housing 3 while piston 1 simultaneously rotates in path $d$ around its center axis $A_1$. These two rotational movements $k$ and $d$ have a ratio with respect to each other of 3:1, i.e., during three complete circular movements $k$ of axis $A_1$ around axis $A_2$, piston 1 makes one complete rotation $d$ around its axis $A_1$. Such movements are maintained through the agency of an internally toothed gear 4 and an externally toothed gear 5 rolling off within gear 4 in a well known manner. Similarly, the use of a eccentric to transmit movement of the piston to a shaft is well known and needs no further explanation here, especially since such known means form no part of the present invention. Sealing elements 2 secured at the apices of piston 1 describe an envelope formed by the inner contour of housing 3. Sealing elements 2 thus touch housing 3 in each position of piston 1 whereby three separated working chambers 6, 6' and 6" are formed between piston 1 and housing 3. During one revolution $d$ of piston 1, and thus during three rotations $k$ of its center $A_1$ with respect to housing 3, all of the working chambers experience two phases wherein their volume changes from its maximum to minimum value or vice versa. Thus, chamber 6, 6' and 6" can be used for doing displacement work as in a blower or pump, for compression work as in a compressor, for expansion work as in a steam engine, or for combined compression and expansion performance as in an interal combustion engine. Depending upon the intended purpose and function of the machine, suitable inlet and outlet openings for the working media are provided, as well as combustion chambers, ignition devices and the like if applicable in a manner known per se at suitable positions upon the housing or piston.

The sealing elements 2 within the apices of piston 1 make a slight tilting movement relative to the inner contour of housing 3 during rotation of piston 1. Accordingly, sealing elements 2 have a different angle with regard to the inner housing contour at different points around the perimeter of housing 3. Sealing elements 2 are each provided with a sealing surface contour 2'. Each sealing surface contour 2' has a three dimensional arrangement and curvature so that the line of contact between sealing elements 2 and the inner surface of housing 3 will twice oscillate back and forth along sealing surface contour 2' during one revolution $d$ of piston 1. However, for each peripheral sector of housing 3, sealing elements 2 will contact the same point during each revolution. At certain points on the inner surface of housing 3, particularly high wear stresses exist for sealing elements 2, for instance, within the region of the fired zone when the rotary piston machine is constructed as an internal combustion engine. In order to effectively meet these local peak loads, sealing surface contours are provided with a variable curvature which is so disposed with regard to the inner contour of housing 3 that the range or region of greatest sealing engagement occurs at the point or points of greatest wear and stress.

In FIGURE 1, the region of greatest sealing has been shown in connection with the regions behind the points S on the inner contour of housing 3 having the smallest distance from center axis $A_2$ of housing 3 when viewed in the direction of rotation $d$ of piston 1. In the case that the machine is constructed as a four-stroke combustion engine, or as a two-stroke combustion engine, one or both of points S, respectively, are located so as to be impinged upon by the combustion gases.

The curvature of sealing surface contour 2' in FIGURES 1 and 2 is provided in the form of an involute of a circular arc with a center M (FIGURE 2). Since the point of contact with housing 3 oscillates between points I and II, straight lines $t_1$ and $t_2$ are, on the one hand, normal lines with regard to sealing surface contour 2' at points I and II respectively, and thus also tangents to the circular arc having the center M, and on the other hand, are tangents to the contact circle of internally-toothed gear 4. According, point I will have a radius $R_1$, the radius of any point O between points I and II will be R, and the radius for point II will be zero. P is the point of intersection of straight lines $t_1$ and $t_2$.

Referring again to FIGURE 1 and to the illustrative positions occupied by a sealing element during the rotation of piston 1, it is apparent that within the region behind point S at the top of the drawing, sealing elements 2 touch the inner contour of housing 3 approximately at point I on sealing surface contour 2'. Contour 2' has its largest radius and thus its minimum curvature within the area of point I as is more evident in FIGURE 2, therefore, sealing elements 2 will achieve their greatest degree of sealing engagement with housing 3 in proximity to the aforementioned point S. From this region up to approximately the next illustrated position of the sealing elements wherein point O' on contour 2' touches housing 3, the degree of sealing engagement is maintained at a relatively high value.

When the rotary piston machine of the present invention is constructed as an internal combustion engine, the change of the pressure gradient between adjacent chambers 6 and 6' separated by a sealing element 2 will occur at the moment of ignition of the charge in the fired zone, i.e., within the region upon the inner contour of housing 3 in the direction of rotation after the point S. At that moment, chamber 6' provided in front of the leading edge of sealing element 2 has a gas pressure which has been reduced somewhat from its maximum value due to expansion of the gases therein. In chamber 6 on the trailing side of sealing element 2, the charge will be ignited with rapidly increasing pressure shortly before the position of piston 1 in which chamber 6 has its smallest volume. In this position of piston 1, one of the sealing elements 2 will be in the schematically illustrated position shown at the top right hand side corner of FIGURE 1. While this is taking place, the pressure gradient which theretofore was directed from chamber 6' towards chamber 6 will change its direction since the pressure in chamber 6 will be rapidly raised. As the result thereof, the pressure acting upon the intermediate sealing element 2 will also be suddenly reversed. Sealing element 2 which has been pressed against the trailing side of its guide groove 8 will be suddenly displaced in the direction of rotation d towards the leading side of guide groove 8 to the extent of the clearance between sealing element 2 and its respective guide groove 8. In order to avoid the occurrence of a radial movement of sealing elements 2 as a consequence of this lateral displacement, and thus prevent any lifting off or removal of sealing elements 2 from the inner contour of housing 3, when that radial movement is too slow, which would be the cause of additional wear upon housing 3 in the form of chatter marks, the sides of sealing elements 2 lie in planes 7' inclined by an angle $\alpha$ with respect to the lines of symmetry s of piston 1. The lateral sides of guide grooves 8 similarly lie within planes 7 parallel to respective planes 7' of the sides of sealing elements 2. The above-mentioned inclination is chosen so that the planes 7 and 7' form angles $\beta$ and $\beta'$ of approximately 90° with tangents $T_1$ and $T_{O'}$ on the inner contour of housing 3, which tangents correspond to contact points I and O', respectively, within the zone of the pressure gradient transition. By this provision, the lateral shifting or displacing movement of sealing elements 2 is transferred to the local direction of the inner contour of housing 3 so that the point of contact of the sealing elements 2 will only make an additional movement along the inner contour of housing 3 during the lateral shifting or displacement, and thus radial movement of the sealing elements 2 within their respective guide channels 8 and the aforementioned disadvantages resulting from such movement are effectively eliminated.

While only the sealing element 2 at the left hand side of FIGURE 1 is shown as having an L-shaped configuration, it will be appreciated that all of the sealing elements in accordance with the present invention may have a similar L-shaped configuration.

In FIGURE 3, there is shown another embodiment of a sealing element in accordance with the present invention wherein sealing element 12 has a sealing surface contour 12' whose curvature consists of three successive circular arcs $k_1$, $k_2$ and $k_3$ having centers $O_1$, $O_2$ and $O_3$ and radii $R_1$, $R_2$ and $R_3$, respectively. At the points of juncture between adjacent arcs there is in each instance a common tangent. The successive arcs $k_1$, $k_2$ and $k_3$ are selected so that the high sealing engagement between sealing members 12 and housing 3 is maintained constant throughout the region of greatest wear and stress, namely, the region extending from and in proximity to point S to the point O' of FIGURE 1 referred to above. Due to this arrangement, particularly high wear may be effectively met in this region on the inner contour of housing 3 or in the area on housing 3 which is diametrically opposite thereto. In this manner, it is possible to achieve relatively low wear on the housing and sealing elements in the fired zones in rotary piston internal combustion engines.

FIGURE 4 illustrates another embodiment of the present invention wherein sealing element 22 has a sealing surface contour 22' whose curvature varies in such a manner that starting at end point I and going towards end point II, the radii initially increase from small values to a maximum, and then within a mean region of a point on sealing surface contour 22' decrease again. Such conditions are met by selecting an evolute E with a starting point $E_I$, a return point $E_u$ and an end point $E_{II}$ as locus of all curvature center points. For an arbitrary point O, the radius will be R. Sealing surface contour 22' is limited, beyond end points I and II of sealing surface contour 22', by the inner envelope of housing 3. It may also be inclined inwardly.

While several embodiments of the present invention have been disclosed and described in accordance with the present invention, it is obvious that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. In a rotary piston machine, a housing having an inner contour in the form of an envelope, a piston rotatable with respect to said housing and having outer contour parts describing said envelope during movements about the axis of said piston and movements about the center axis of said housing, and sealing elements secured in said outer contour parts of said piston, the improvement comprising said sealing elements being provided with sealing surface contours bearing a predetermined relationship with the inner contour of said housing, said sealing surface contours having their largest radius values in sealing engagement with said inner contour of said housing in the regions of said inner contour of said housing exposed to the greatest wear during rotation of said piston, said sealing surface contours having a curvature in the form of an involute of a circular arc.

2. In a rotary piston machine, a housing having an inner contour in the form of an envelope, a piston rotatable with respect to said housing and having outer contour parts describing said envelope during movements about the axis of said piston and movements about the center axis of said housing, and sealing elements secured in said outer contour parts of said piston, the improvement comprising said sealing elements being provided with sealing surface contours bearing a predetermined relationship with the inner contour of said housing, said sealing surface contours having their largest radius values in sealing engagement with said inner contour of said housing in the regions of said inner contour of said housing exposed to the greatest wear during rotation of said piston, said sealing surface contours having a curvature in the form of a plurality of joined circular arcs of different radii having common tangents at each point of juncture.

3. In a rotary piston internal combustion engine having a housing and a piston rotatable therein and describing an envelope corresponding to the inner contour of said housing, said piston dividing said housing into a plurality of chambers, at least one of said chambers being a combustion chamber in which ignition of a charge takes place and essentially also having the highest compression of the charge, said combustion chamber extending on both sides of a point on the inner contour of said housing spaced the smallest distance from the center of said housing; the improvement comprising sealing elements mounted in apices of said piston, said sealing elements having sealing surface portions in sealing engagement with the inner contour of said housing, and said sealing surface portions having a curvature, the radius of which varies along said sealing surface contour in the direction of movement of said piston and which is correlated to the inner contour of said housing to contact said inner contour of said housing within a zone directly behind said point of smallest distance from the center of said housing with that portion of said sealing surface contour having the largest radius values, the portions of said sealing surface contour having the smaller radius values contacting said housing in regions other than said last-mentioned zone.

4. A rotary piston machine comprising a housing having an inner contour in the form of an envelope, a piston rotatable with respect to said housing and describing said envelope during rotation, said piston being provided with guide grooves, and sealing elements movably secured in said guide grooves, said sealing elements being provided with sealing surface contours participating in describing said envelope, said sealing elements being provided with sealing surface contours having a predetermined curvature, the radius of which varies in the peripheral direction of said sealing surface contours so as to bear a predetermined relationship with the inner contour of said housing during rotation of said piston, said sealing surface contours having their largest radius values in sealing engagement with said inner contour of said housing in regions adjacent to points of shortest distance from the center of said housing and slightly behind as viewed in the direction of rotation of said piston, said sealing surface contours having their smaller radius values in sealing engagement with said inner contour in zones intermediate said last-mentioned regions.

5. In a rotary piston machine comprising a housing and a piston rotatable therein and describing an envelope corresponding to the inner contour of said housing by rotational movements about the axis of said piston and by circular movements of said axis about the center axis of said housing, said movements having an integral ratio with respect to each other, said piston forming with said housing a plurality of chambers, the volumes of which vary during the relative rotation between said piston and said housing whereby an alternating pressure gradient is produced between adjacent chambers, said inner contour being provided with a plurality of points having a smallest distance from said center axis and alternating with a plurality of points having a greatest distance from said center axis, said piston being essentially of polygonal configuration and having a plurality of apieces, lines of symmetry passing through said apices and intersecting in said piston axis, guide grooves provided in said piston substantially at the apices thereof, sealing elements inserted in said guide grooves and movable therein, said sealing elements being provided with outer contour parts participating in describing said envelope and contacting said inner housing contour, the radial axes of said sealing elements being inclined with respect to said lines of symmetry so that the angle between the planes in which the lateral sides of said sealing elements lie and the tangents to said inner contour at the point of contact of said sealing elements is greater than 85° and less than 95° in zones in which the direction of said presure gradient is inversed and which lie between 15° beyond the point of smallest distance in the direction of rotor rotation and 15° before reaching the point of greatest distance next following, in the direction of rotor rotation, said point of smallest distance.

6. In a rotary piston according to claim 5, wherein said outer contour parts having a varying curvature, said curvature being derived from a constant curve.

7. In a rotary piston according to claim 5, wherein said outer contour parts conform to a curve in the form of a plurality of joined circular arcs of different radii.

8. In a rotary piston according to claim 5, wherein said outer contour parts have a curvature in the form of an involute of a circular arc.

References Cited by the Examiner

UNITED STATES PATENTS

| | | | |
|---|---|---|---|
| 333,356 | 12/85 | Taber | 103—138 |
| 1,434,716 | 11/22 | Marion | 103—137 |
| 1,636,486 | 7/27 | Planche | 123—8 |
| 2,165,963 | 7/39 | Curtis | 103—138 |
| 2,348,881 | 5/44 | Blood | 103—137 |
| 2,353,965 | 7/44 | Meador | 103—138 |
| 2,435,279 | 2/48 | Hubacker | 103—135 |
| 2,880,045 | 3/59 | Wankel | 123—8 |
| 2,885,960 | 5/59 | Deschamps | 103—135 |
| 2,949,081 | 8/60 | Deschamps | 103—135 |
| 2,988,065 | 6/61 | Wankel et al. | 123—8 |
| 3,033,180 | 5/62 | Bentele | 123—8 |

FOREIGN PATENTS

| | | |
|---|---|---|
| 797,578 | 2/36 | France. |
| 171,677 | 6/06 | Germany. |
| 483,859 | 10/29 | Germany. |

SAMUEL LEVINE, *Primary Examiner.*

KARL J. ALBRECHT, JOSEPH H. BRANSON, JR.,
*Examiners.*